Sept. 28, 1948.    O. A. LOGAN    2,450,201
FIFTH WHEEL ASSEMBLY
Filed Feb. 12, 1945    3 Sheets-Sheet 1
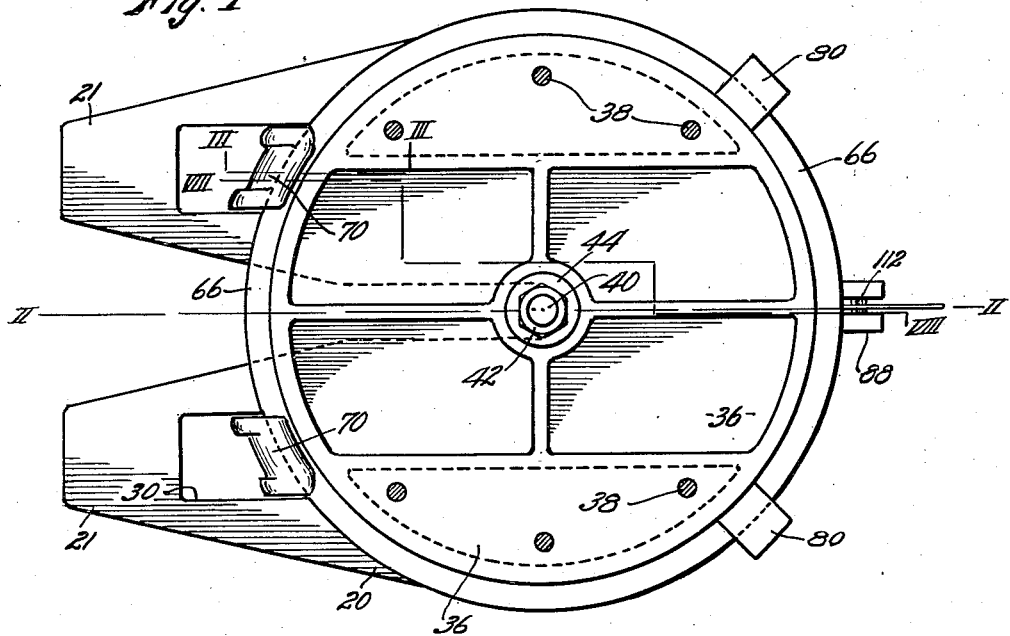
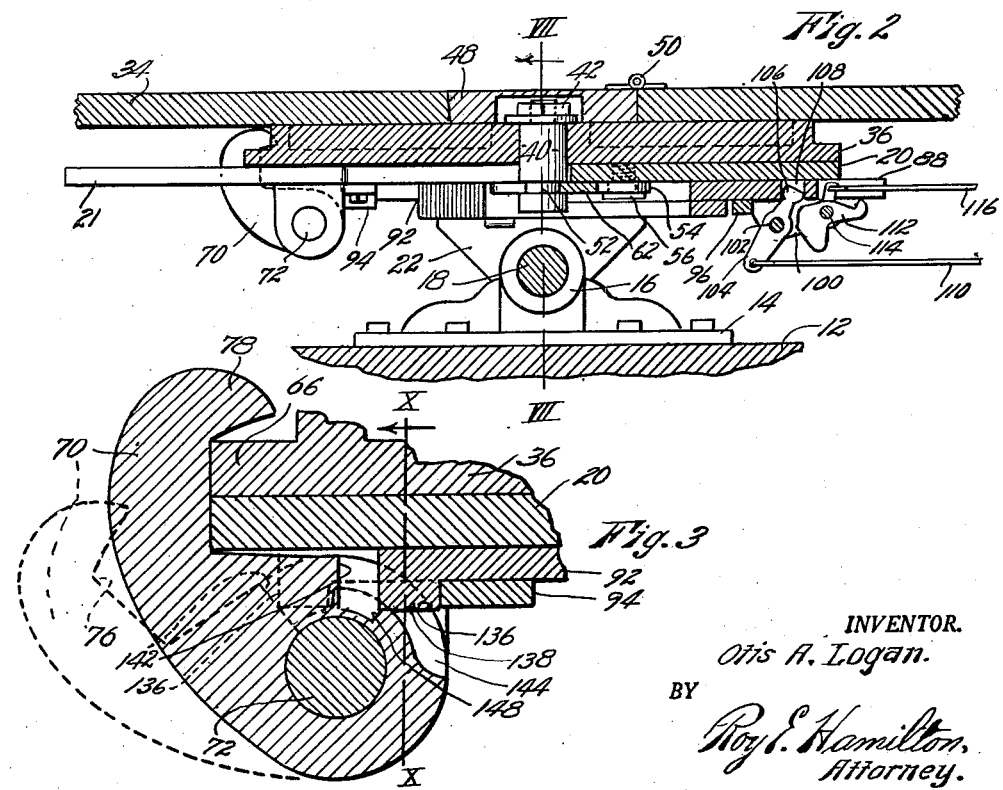
INVENTOR.
Otis A. Logan.
BY
Roy E. Hamilton,
Attorney.

Sept. 28, 1948.  O. A. LOGAN  2,450,201
FIFTH WHEEL ASSEMBLY
Filed Feb. 12, 1945  3 Sheets-Sheet 2
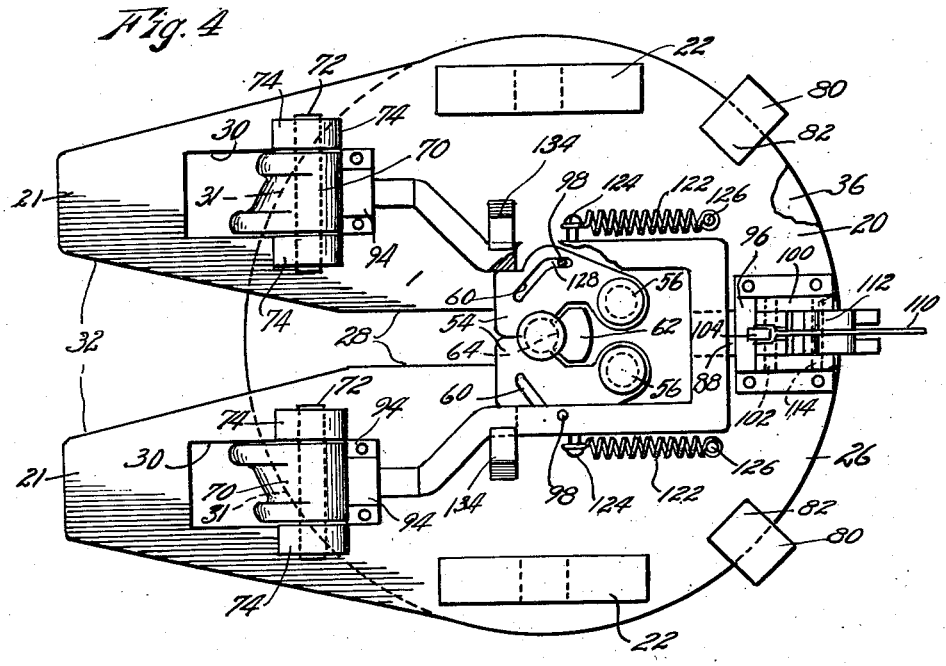
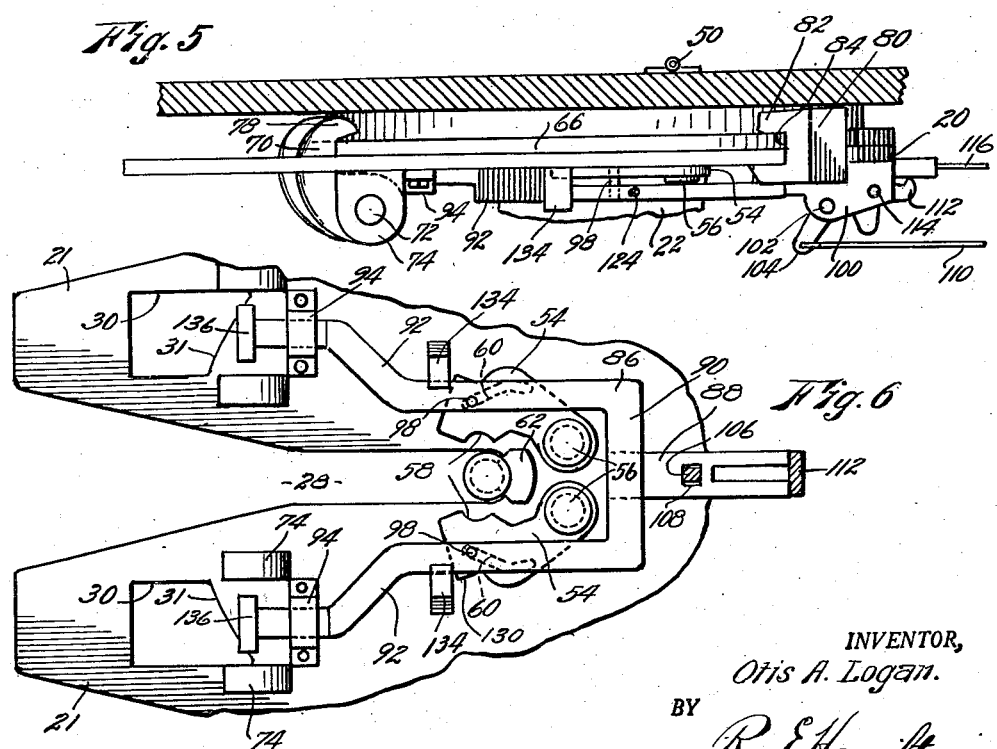
INVENTOR,
Otis A. Logan.
BY Roy E. Hamilton,
Attorney.

Sept. 28, 1948.  O. A. LOGAN  2,450,201
FIFTH WHEEL ASSEMBLY
Filed Feb. 12, 1945  3 Sheets-Sheet 3

INVENTOR,
Otis A. Logan.
BY
Ray E. Hamilton,
Attorney.

Patented Sept. 28, 1948

2,450,201

UNITED STATES PATENT OFFICE 2,450,201

FIFTH WHEEL ASSEMBLY

Otis A. Logan, Kansas City, Mo.

Application February 12, 1945, Serial No. 577,556

4 Claims. (Cl. 280—33.05)

This invention relates to improvements in fifth wheel assemblies and refers particularly to those fifth wheel structures employed to couple together the well known tractor and trailer assemblies.

This is an improvement over my Patent No. 2,166,308, issued July 18, 1939.

The principal object of the present invention is the provision of a fifth wheel structure provided with means for removably securing the king pin in the operative position including means positionable into the path of travel of said securing means whereby to prevent accidental displacement of said king pin securing means.

Another object of the present invention is the provision of a fifth wheel structure including a circular trailer plate removably engageable at its periphery by a pair of stationary dogs at its forward side and by a pair of pivoted dogs at its rear side.

A further object is the provision of a fifth wheel structure including a trailer plate and a tractor plate having a pair of pivotally mounted dogs for securing said plates in the operative position and means positioned to preclude rotary movement of said pivotal dogs when they are in the securing position.

Other objects of this invention are simplicity and sturdiness of construction, ease and efficiency of operation and adaptability for use with the various types of tractors and trailers or semi-trailers now in general use.

With these objects in view as well as other objects which will appear during the course of the specification, reference will now be had to the drawings, wherein:

Figure 1 is a plan view of a fifth wheel assembly embodying this invention.

Fig. 2 is a vertical central sectional view taken on line II—II of Fig. 1 and including a portion of the trailer structure.

Fig. 3 is an enlarged fragmentary sectional view taken on line III—III of Fig. 1.

Fig. 4 is an inverted plan view of the fifth wheel structure with parts broken away.

Fig. 5 is a vertical sectional view of a portion of the trailer with the fifth wheel shown in side elevation and with parts thereof broken away.

Fig. 6 is an inverted plan view of a portion of the tractor plate with the dog operating means and the king pin securing means shown in the released position.

Figure 7:
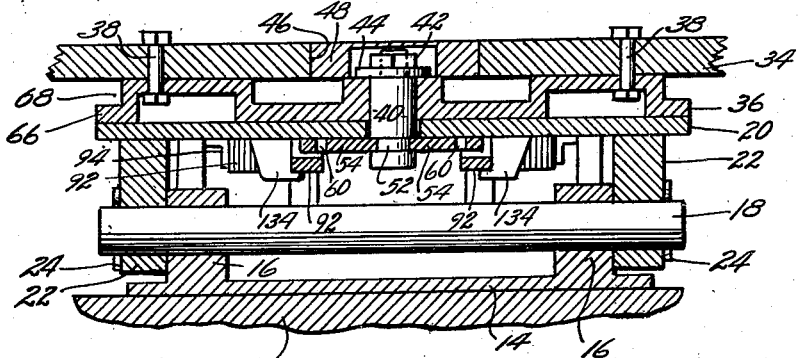
Fig. 7 is a vertical cross sectional view taken on line VII—VII of Fig. 2.

Throughout the several views like reference characters refer to similar parts and the numeral 12 designates a fragmentary part of a tractor to which is securely attached a plate 14 having spaced apart bearings 16. These bearings carry a horizontally disposed shaft 18 on which is mounted for limited pivotal movement, a tractor plate 20. This tractor plate is provided adjacent its opposite edges with depending bearings 22 for mounting on shaft 18. Cotter keys 24 serve to secure the shaft in operative position against longitudinal movement. The front portion 26 of tractor plate 20 is substantially semi-circular while the rear portion thereof is bifurcated to present a slot 28 to receive the king pin as hereinafter described. This rearward portion of plate 20 extends beyond the extended semi-circular portion of plate 20 and each leg 21 thereof is provided with an opening 30, the inner wall 31 of which coincides with said extended circle while the opposite side wall thereof extends adjacent the rearward end of 21. The rearward end of slot 28 is flared outwardly at 32 as clearly shown in Fig. 4 to facilitate positioning of the king pin as the fifth wheel coupling is being made.

The trailer body 34 is provided with a trailer plate 36 which is circular in form and has a radius equal to the radius of a semi-circular portion of the trailer plate. This trailer plate is secured to the trailer body by means of bolts 38 and is provided at its axis with a depending king pin 40 which extends through the body of the trailer plate and is secured thereto by means of a nut 42 and washer 44. An aperture 46 provided with a closure 48 is hinged at 50 whereby access is had to the king pin disposed thereunderneath. King pin 40 extends beyond the lower surface of tractor plate 20 and is provided with an annular groove 52 having its upper wall in the plane of the lower face of tractor plate 20 and being of sufficient width to receive jaws 54 which are pivotally mounted at 56 to the under side of tractor plate 20. These jaws 54 are each provided with arcuate recesses 58 to snugly fit king pin 40 at the base of groove 52 and also have oppositely disposed cam slots 60 by means of which the jaws 54 are caused to move to and from the pin securing position. A plate 62 rigid with tractor plate 20 is so positioned that its arcuate section 64 is concentric with the axis of tractor plate 20 and is adapted to enter the annular groove 52 of the king pin 40 so that as the king pin is moved along slot 28 during the coupling operation, the king pin 40 will be properly centered to receive the jaws 54 with the arcuate recess portions thereof in groove 52, thereby securing the trailer plate and tractor plate in planar contacting relation.

The lower portion of trailer plate 36 is provided with an annular flange 66, thus presenting an annular groove 68 intermediate said flange and the lower surface of the trailer body 34.

Figure 8:
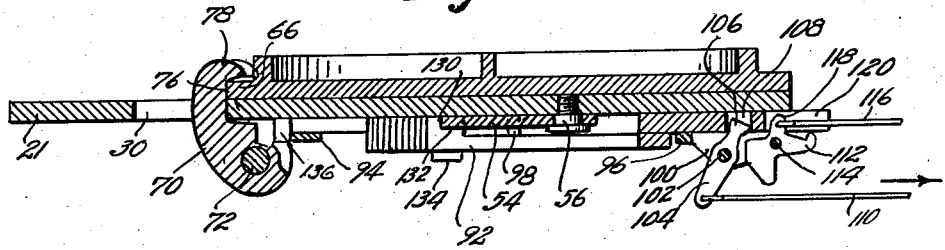
Fig. 8 is a vertical section taken on irregular line VIII—XIII of Fig. 1, with the securing means shown in the locked position.

Referring to Fig. 7, it will be noted that the outer periphery of trailer plate 36 coincides with the outer periphery of tractor plate 20 and also that the outer periphery of trailer plate 36 coincides with the arcuate wall 31 of opening 30. A pair of pivoted jaws 70 mounted for limited pivotal movement on pins 72 supported in bearings 74 depending from tractor plate 20, are adapted to be moved to the plate securing position as shown in Fig. 8 and to the released position as clearly shown in Fig. 9. It will be noted that when the dog is in the securing position, the recess 76 formed therein, will receive the edge portions of the trailer plate 36 and tractor plate 20 with the head of the dog 78 positioned in the groove 68. Furthermore, when the dog 70 is moved to the released position, the head 78 thereof will be disposed below the upper surface of the tractor plate 20, thereby presenting a smooth planar surface of the tractor plate for receiving the trailer plate when effecting a coupling of the fifth wheel. It will be noted that the pins 72 are in axial alignment and that the dogs 70 are disposed equi-distant from the longitudinal axis of the tractor plate 20. A pair of stationary dogs 80 rigidly attached to the tractor plate 20 are of U-shape and have one leg 82 thereof positioned above the upper surface of tractor plate 20 a sufficient distance to permit the edge portion of the trailer plate to pass therebetween and rest against the inner vertical wall 84 of the dog. These stationary dogs, together with the pivoted dogs 70, are so positioned as to securely hold the trailer plate and tractor plate in operative relation and to permit relative rotary movement thereof regardless of the presence of the king pin so that should the king pin break or become inoperative for any reason, the fifth wheel would remain operative to properly control the trailer.

Manually operable means for operating the pivoted dogs and jaws include a substantially Y-shaped member 86 of symmetrical form having a stem 88, a cross section 90 and similar side arms 92. This Y-shaped member is slidably mounted on the under side of tractor plate 20 by means of brackets 94 and 96 for movement parallel with the major axis of tractor plate 20. The free ends of side arms 92 and the stem 88 of the Y-member 86 rest against the lower side of tractor plate 20 while the cross portion 90 and the adjacent portions of side arms 92 are positioned in spaced relation below said tractor plate to permit the positioning of jaws 54 therebeneath. Operating pins 98 securely carried by side arms 92 engage cam slots 60 formed through the jaws 54 so that when the Y-member 86 is moved longitudinally as hereinafter described, the jaws 54 will be moved to and from the king pin securing position.

Figure 9:
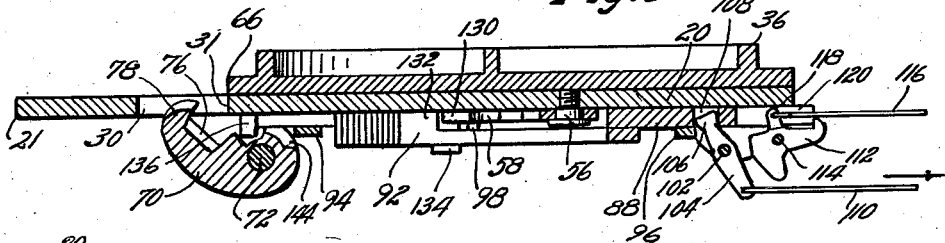
Fig. 9 is a view similar to that shown in Fig. 8 with the plate engaging means and the king pin engaging means moved to the releasing position.
Figure 10:
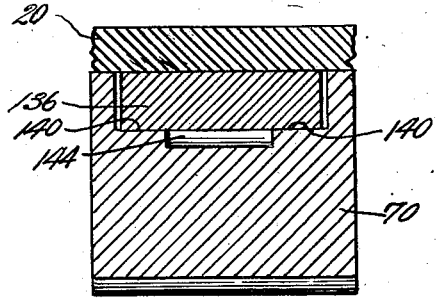
Fig. 10 is a fragmentary sectional view taken on line X—X of Fig. 3.

Bracket 96 which encompasses the stem 88 is provided with spaced apart bearing walls 100 between which is pivotally mounted at 102 an operating lever 104. The upper end 106 is substantially semi-circular in form and is projected into an opening 108 formed through stem 88. An operating rod 110 extending forwardly, may be accessible to the tractor operator by any suitable means not shown. It will be observed that when the operator pulls the rod in the direction indicated by the arrow in Fig. 8, the Y-shaped member 86 will be moved to the position shown in Fig. 9. A gravity latch member 112 pivoted at 114 to side walls 100 is also provided with an operating rod 116 which engages an ear 118 projecting into slot 120 formed in the outer end of stem 88. This latch 112 is adapted to engage the outer end of stem 88 when the pivoted dogs and jaws are in the inoperative position as shown in Figs. 6 and 9. Springs 122 secured respectively to pins 124 carried by the Y-member 86 are secured at their opposite ends to pins 126 mounted in the lower side of tractor plate 20. These springs are under tension at all times and serve to normally hold the Y-shaped member in the retracted or securing position. When these engaging parts are in the retracted position as shown in Fig. 9, the operator may, by pulling the rod 116 in the direction indicated by the arrow, release the latch 112 so that springs 122 will cause the Y-member to move to the retracted or securing position.

Referring to Figs. 4 and 6, reference is had to the cam slot 60. This cam slot has a portion 128 which is parallel with the direction of travel of the operating pins 98. The length of this portion of the slot is such that the free end 130 of jaw 54 will be disengaged from the upper portion 132 of side arm 92 before jaw 54 starts to move in a radial path on the pivot 56 as shown in Fig. 6 due to the action of the operating pin in the diagonally disposed section of the cam slot. The object of so constructing the jaw operating means is to definitely secure the jaws 54 against opening so long as the Y-shaped member 86 is in the retracted position where it is securely held by the action of springs 122. To reenforce the side arms 92 against outward movement at the point of pressure of jaws 54 overlapping abutments 134 are provided. These abutments are preferably integral with tractor plate 20 and are sufficiently strong to withstand any pressure that might be exerted against the side arms.

The operation of the pivoted dogs 70, best shown in Figs. 3, 8, 9 and 10, includes an operating head 136 secured to the free end of side arm 92 which normally rests against the bracket 94 due to the action of springs 122. When so positioned, the lower planar surface 138 of the head is adapted to rest on shoulders 140 formed in the body of dog 70 and extending adjacent opposite sides of the dog. The position of these parts as just described, obtain when the dog is in the securing position as shown in solid lines in Fig. 3, and it will be noted that the operating head 136 is positioned forward of the vertical axial plane of the pivot 72 in such a manner as to preclude any possible rotary movement of the dog on its axis. Since pin 72 is relatively large and the head 136 fits snugly between planar surface 138 and the lower face of tractor plate 20, a compression action against head 136 will be exerted to further hold the parts against accidental movement. When the operator moves lever 104 to the position shown in Fig. 9, operating head 136 will move to the position shown in dotted lines in Fig. 3 and the dog will be moved to the dotted position by the action of the outer extremity of the operating head striking the substantially radial disposed ledge 142 formed in the body of the dog. During this operation, the side arm 92 will move to intersect a portion of the body of the dog 70 and to prevent interference of the parts, a recess 144 is made in the body of the dog of sufficient width to span the side arm. When the latch 112 is released after the dogs have been moved to the inactive position as just described, the forward edge 146 of operating head 136 will engage the planar surface 138 to move the dog to the securing position through the action of springs 122.

It is apparent that the dogs and also the securing jaws are definitely secured against any possible dislodgment due to interconnecting links, levers or intermediate parts and that they are directly secured in position by adjacent rigid members. In order to insure the proper strength, it is deemed advisable to harden certain of the parts to prevent undue wear.

It is obvious to one skilled in the art that many changes in form, structure and arrangement of the parts might be made without departing from the spirit and scope of the invention.

Having thus described the invention, what I claim as new and desire to be secured by Letters Patent is:

1. In a fifth wheel assembly, a tractor plate having a king pin receiving slot with a pin seat at its forward end; a circular trailer plate having a centrally depending king pin and an annular peripheral flange; fixed dogs carried at the forward edge of said tractor plate to engage the forward periphery of said trailer plate and pivotally mounted dogs adjacent the rear end of said trailer plate; and resilient means to normally urge said pivoted dogs to engage the annular flange of said trailer plate and manually operable means to move said pivoted dogs below the upper surface of said tractor plate.

2. In a fifth wheel assembly, a tractor plate having a king pin receiving slot; a circular trailer plate having a centrally disposed king pin adapted to be positioned on said tractor plate with the king pin positioned in said tractor plate slot; fixed dogs carried at the forward edge of said tractor plate to receive the peripheral edge of said trailer plate, and jaws pivoted to the under side and at the rear portion of said tractor plate; manually operable means to oscillate said pivoted jaws to and from a position below the top face of said tractor plate to operatively engage the peripheral edge of said trailer plate positioned on top of said tractor plate, said operating means including a head adapted to be inserted between said pivoted jaw and the lower face of the tractor plate whereby the jaw is secured against rotary movement.

3. In a fifth wheel assembly, a tractor plate having a king pin receiving slot; a circular trailer plate having a centrally disposed king pin adapted to be positioned on said tractor plate with the king pin positioned in said tractor plate slot; fixed dogs carried at the forward edge of said tractor plate to receive the peripheral edge of said trailer plate, jaws pivoted to the under side and at the rear portion of said tractor plate; manually operable means to oscillate said pivoted jaws to and from a position below the top face of said tractor plate to operatively engage the peripheral edge of said trailer plate positioned on top of said trailer plate, said operating means including a head adapted to be inserted between said pivoted jaw and the lower face of the tractor plate whereby the jaw is secured against rotary movement, and resilient means to normally urge said pivoted jaws to the trailer plate engaging position.

4. In a fifth wheel assembly, a tractor plate having a king pin receiving slot; a circular trailer plate having a centrally disposed king pin and being adapted to be positioned on said tractor plate with the king pin positioned in said tractor plate slot; fixed dogs carried at the forward edge of said tractor plate to receive the peripheral edge of said trailer plate; dogs pivoted to the under side and at the rear portion of said tractor plate; manually operable means to oscillate said pivoted dogs to and from a position below the top face of said tractor plate to operatively engage the peripheral edge of said trailer plate positioned on top of said trailer plate, said operating means including a head adapted to be inserted between said pivoted dogs and the lower face of the tractor plate whereby the dog is secured against rotary movement; resilient means to normally urge said pivoted jaws to the trailer plate engaging position, and spring actuated means operable to normally secure said king pin and said adjustable dogs in the operative position.

OTIS A. LOGAN.

REFERENCES CITED

The following references are of record in the file of this patent:

UNITED STATES PATENTS

| Number | Name | Date |
|---|---|---|
| 2,166,308 | Logan | Jan. 18, 1939 |